(12) United States Patent
Boyle (10) Patent No.: US 11,952,898 B2
(45) Date of Patent: Apr. 9, 2024

(54) ATMOSPHERIC ASTEROID MINER/PACKAGER

(71) Applicant: Joshua Thomas Boyle, Mountainside, NJ (US)

(72) Inventor: Joshua Thomas Boyle, Mountainside, NJ (US)

( * ) Notice: Subject to any disclaimer, the term of this patent is extended or adjusted under 35 U.S.C. 154(b) by 0 days.

(21) Appl. No.: 18/550,110

(22) PCT Filed: Mar. 9, 2022

(86) PCT No.: PCT/US2022/019588
§ 371 (c)(1),
(2) Date: Sep. 11, 2023

(87) PCT Pub. No.: WO2022/192424
PCT Pub. Date: Sep. 15, 2022

(65) Prior Publication Data
US 2024/0044250 A1  Feb. 8, 2024

Related U.S. Application Data

(60) Provisional application No. 63/158,559, filed on Mar. 9, 2021.

(51) Int. Cl.
*E21C 51/00* (2006.01)
*B64G 4/00* (2006.01)
(Continued)

(52) U.S. Cl.
CPC ............... *E21C 51/00* (2013.01); *B64G 4/00* (2013.01); *E21B 7/00* (2013.01); *E21B 41/00* (2013.01); *E21C 37/20* (2013.01)

(58) Field of Classification Search
CPC .. B64G 4/00; B64G 1/66; E21C 51/00; E21B 3/02; E21B 7/00; E21B 41/00; G01N 1/08; G01N 1/14
See application file for complete search history.

(56) References Cited

U.S. PATENT DOCUMENTS

| 9,266,627 | B1 |   | 2/2016 | Anderson et al. |
| 11,725,513 | B2 | * | 8/2023 | Sercel ............... E21C 51/00 166/302 |

(Continued)

FOREIGN PATENT DOCUMENTS

| CN | 106691308 A | * | 5/2017 |
| CN | 107244428 B |   | 9/2019 |

(Continued)

*Primary Examiner* — Daniel P Stephenson (57) ABSTRACT

A system and apparatuses for breaking down and collecting asteroids. The asteroid miner apparatus comprises a body, an aperture, a plurality of holes, a plurality of speakers, a drill, an attachment piece, a fan, a baggage, and a set of air compressors. The drill and plurality of speakers are attached to the body to break down matter. The set of air compressors expel air through the plurality of holes to create an atmosphere around the body. The fan is attached to the body to create a current of air though the aperture. The baggage is attached to the body to collect pieces of asteroid. The system comprises a plurality of asteroid miners and an attachment piece to connect the asteroid miners. The system may be placed around an asteroid or other piece of material to break down the material and collect portions of the material.

19 Claims, 12 Drawing Sheets

(51) Int. Cl.
 *E21B 7/00* (2006.01)
 *E21B 41/00* (2006.01)
 *E21C 37/20* (2006.01)

(56) References Cited

U.S. PATENT DOCUMENTS

| | | | | |
|---|---|---|---|---|
| 11,738,891 | B1 * | 8/2023 | Dorais | B64G 1/646 |
| | | | | 244/171.1 |
| 2007/0243031 | A1 | 10/2007 | Yun | |
| 2019/0172598 | A1 | 6/2019 | Drexler | |
| 2023/0304403 | A1 * | 9/2023 | Kuhns | E21C 37/16 |
| | | | | 299/6 |

FOREIGN PATENT DOCUMENTS

| | | | | |
|---|---|---|---|---|
| CN | 210802973 U | | 6/2020 | |
| JP | 2017007072 A | * | 1/2017 | |
| WO | WO-2022055673 A1 | * | 3/2022 | B01D 8/00 |
| WO | WO-2022192424 A1 | * | 9/2022 | |

* cited by examiner

ATMOSPHERIC ASTEROID MINER/PACKAGER

FIELD OF THE INVENTION

The present invention relates to asteroid mining. More specifically, the present invention is an apparatus designed to mine and break down asteroids.

BACKGROUND OF THE INVENTION

The study of asteroids has existed for many decades as it is one part of studying the solar system. The study of asteroids may assist the human species to discover and study other plants as well as find the existence of extraterrestrial within the unknown. The methods of mining and breaking down asteroids are extremely rare due to the availability and ability of obtaining an asteroid. Beyond the study of extra-terrestrial bodies, mining and packaging asteroids may be done to gather resources that are more plentiful in space than on Earth. Many drills and other mining devices currently exist to break down rocks and other objects. However, mining asteroids and operating in space requires a variety of considerations to account for the lack of atmosphere and standard gravity.

An objective of the present invention is to provide an apparatus that is utilized to break down and separate asteroids into smaller partitions to collect them for use and study. The present invention provides an apparatus that is remote controlled or controlled by artificial intelligence. In addition, the present invention provides a method of obtaining samples of asteroids from outer space to Earth.

SUMMARY OF THE INVENTION

The present invention is a system and apparatuses for breaking down and collecting portions of asteroids. The asteroid miner of the present invention comprises a body, an aperture, a plurality of holes, a plurality of speakers, a drill, an attachment piece, a fan, a baggage, and a set of air compressors. The drill and plurality of speakers are attached to the interior surface of the body and operate to breakdown asteroids. The set of air compressors are configured to expel air to create an air pressure on the interior side of the body. The fan operates in conjunction with the air compressors and the plurality of holes to create a current of air though the aperture. The baggage is attached to the exterior surface of the body to collect pieces of asteroid that are sent through the aperture. The system of the present invention comprises a plurality of asteroid miners and an attachment piece. The attachment piece is a frame structure comprising a plurality of slots, each configured to receive one of the plurality of asteroid miners. When each of the plurality of slots is joined with an asteroid miner, the system of the present invention is an enclosed spherical shell capable of breaking down an asteroid within the shell and expelling portions of the asteroid out of the shell.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list." All illustrations of the drawings are for the purpose of describing selected versions of the present invention and are not intended to limit the scope of the present invention.

All illustrations of the drawings are for the purpose of describing selected versions of the present invention and are not intended to limit the scope of the present invention.

The asteroid miner 1 and associated system of the present invention comprises a body 10, an aperture 11, a plurality of holes 12, a plurality of speakers 15, a drill 13, an attachment piece 2, a fan 16, and a set of air compressors 14.

The body 10 is the main structure and frame of the asteroid miner 1. The body 10 is a solid plate that takes shape of a regular pentagon/hexagon as can be seen in FIGS. 1-2 and 5-6. The body 10 has an interior face 101 and an exterior face 102. Note that within other embodiments of the present invention, the body 10 may be found in different shapes.

The aperture 11 is an opening hole/gap centered on the body 10 of the asteroid miner 1 as can be seen in FIGS. 1, 2, 5, 6, and 10. The aperture 11 is the openable pathway to allow broken-down partitions of an asteroid to reach a baggage 17 attached to the exterior face of the aperture 11. The aperture 11 is circular in the preferred embodiment, similar to an aperture 11 to a camera. The aperture 11 comprises at least one aperture wall 110 that extends to reach a closed position and prevent anything from passing through the aperture 11. The at least one aperture wall 110 compresses to reach an open position to allow objects to pass through the aperture 11. In the preferred circular embodiment of the aperture 11, the aperture 11 may comprise more than one aperture wall, with each of the at least one aperture wall 110 configured to extend simultaneously into a closed position.

Figure 10:
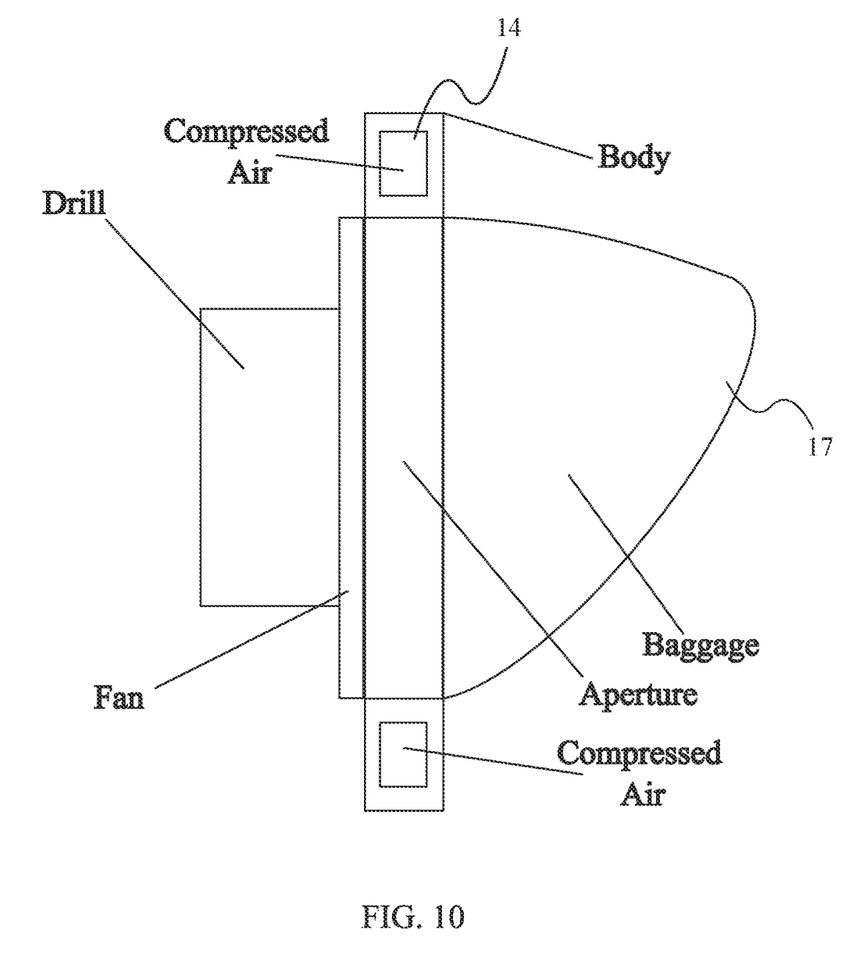
FIG. 10 is a vertical cross-sectional illustration of the body of the present invention.

In reference to FIG. 10, the baggage 17 is the component that captures and stores debris of a broken-down asteroid. The baggage 17 is found on the exterior face 102 of the body 10. The baggage opening aligns with and attaches to the edges of the aperture 11. As shown in FIGS. 1, 2, 4, 5, 6, and 8 the baggage 17 is not shown. However, the baggage 17 can be seen in FIG. 10 for illustration purposes. There exists a baggage 17 attached to the exterior surface 102 of the body 10. More specifically, the baggage 17 aligns onto the aperture 11 to capture debris of broken-down asteroid. In some embodiments, the baggage 17 is detachable from the body 10 and replaceable, allowing the body 10 to continue to operate while debris from the baggage 17 is collected.

The plurality of holes 12 are small holes found along the outer edge of the body 10. The plurality of holes 12 may comprise a plurality of interior holes 120, positioned on the interior face of the body 10, and a plurality of exterior holes 121, positioned on the exterior face of the body 10. More specifically, the plurality of holes 12 may be found near the corner edges of interior face 101 and the exterior face 102 of the body 10 as can be seen in FIGS. 2, 3, 6, and 7. In most embodiments the number of the plurality of holes 12 on each face of the body 10 matches the number of corners on the body 10, directly relating to the number of sides in the shape of the body 10. For example, there may be five holes on the body 10 if the body 10 is pentagon-shaped as there are five sides to create a pentagon. The plurality of holes 12 penetrate the body 10. The plurality of holes 12 are utilized to allow compressed air to dispense from the present invention. The plurality of holes 12 fluidly connect to the air compressor and are configured to allow air through the plurality of holes 12 from the air compressor. The plurality of interior holes 120 are configured to expel air from the interior face 101 of the body 10, while the plurality of exterior holes 121 are configured to expel air from the exterior face 102 of the body 10. In one embodiment, the plurality of holes 12 can be used in unison with the air compressor to maneuver throughout space by means of pumping air through the plurality of exterior holes 121 on the exterior face 102 of the body 10.

The air compressor 14 is utilized to create a vacuum-like mechanism within the present invention. The air compressor operates in unison with the plurality of holes 12 and the fan 16 to create the vacuum mechanism to push and suck air from the interior face 101 of the present invention to the exterior face 102, through the aperture 11 and into the baggage 17. In use, the air compressor 14 may send air through the plurality of interior holes 120 to the interior face 101 of the body 10 in order to create air pressure on the interior side of the body 10. Alternatively, the air compressor 14 may send air through the plurality of exterior holes 121 to the exterior face 102 of the body 10 in order to reorient the body 10 by expelling air. The air compressor 14 is found internal within the body 10 as can be seen in FIG. 10.

The fan 16 assists with the vacuum mechanism to push and suck air from the interior face 101 of the body 10 to the exterior face 102 of the body 10 through the aperture 11 and into the baggage 17. The fan 16 is designed and oriented to create a current of air from the interior face 101 of the body 10 to the exterior face 102 of the body 10 when in operation. The fan 16 is located on the interior face 101 of the body 10 and rotatably connected to the interior face 101 of the body 10. The fan 16 is on the opposite side of the body 1 from baggage 17 and aligns with the aperture 11 similarly to how the baggage 17 aligns with the aperture 11 as can be seen in FIG. 10. The fan 16 does not fully obstruct the aperture 11.

The plurality of speakers 15 are devices utilized as a mechanism to assist the breakdown of asteroids. The plurality of speakers 15 are configured to emit sound waves that aid in the breakdown of asteroids. The plurality of speakers 15 are located near the outer edge of the interior face 101 of the body 10. More specifically, the plurality of speakers 15 are found centered along the side edges of the interior face 101 of the body 10 as can be seen on FIGS. 3 and 7. The number of speakers 15 may directly relate to the number of sides found to create the shape of the body 10. For example, there may be five speakers 15 on the body 10 if the body 10 is pentagon-shaped as there are five sides to create a pentagon.

The drill 13 is a mechanical device utilized to break down asteroids. Note that the drill 13 can be found in different shapes, forms, and sizes within different embodiments of the present invention. The drill 13 can be any tool for breaking down an asteroid such as a standard hand drill, a device with a plurality of elongated spirals, or a grinder. The drill 13 is found on the interior face of the body 10 and is oriented away from the body 10. The drill 13 is located aligned with the aperture 11 similar to the baggage 17 and the fan 16. The drill 13 may be located on the fan 16 in some embodiments, as can be seen in FIG. 10.

Figure 11:
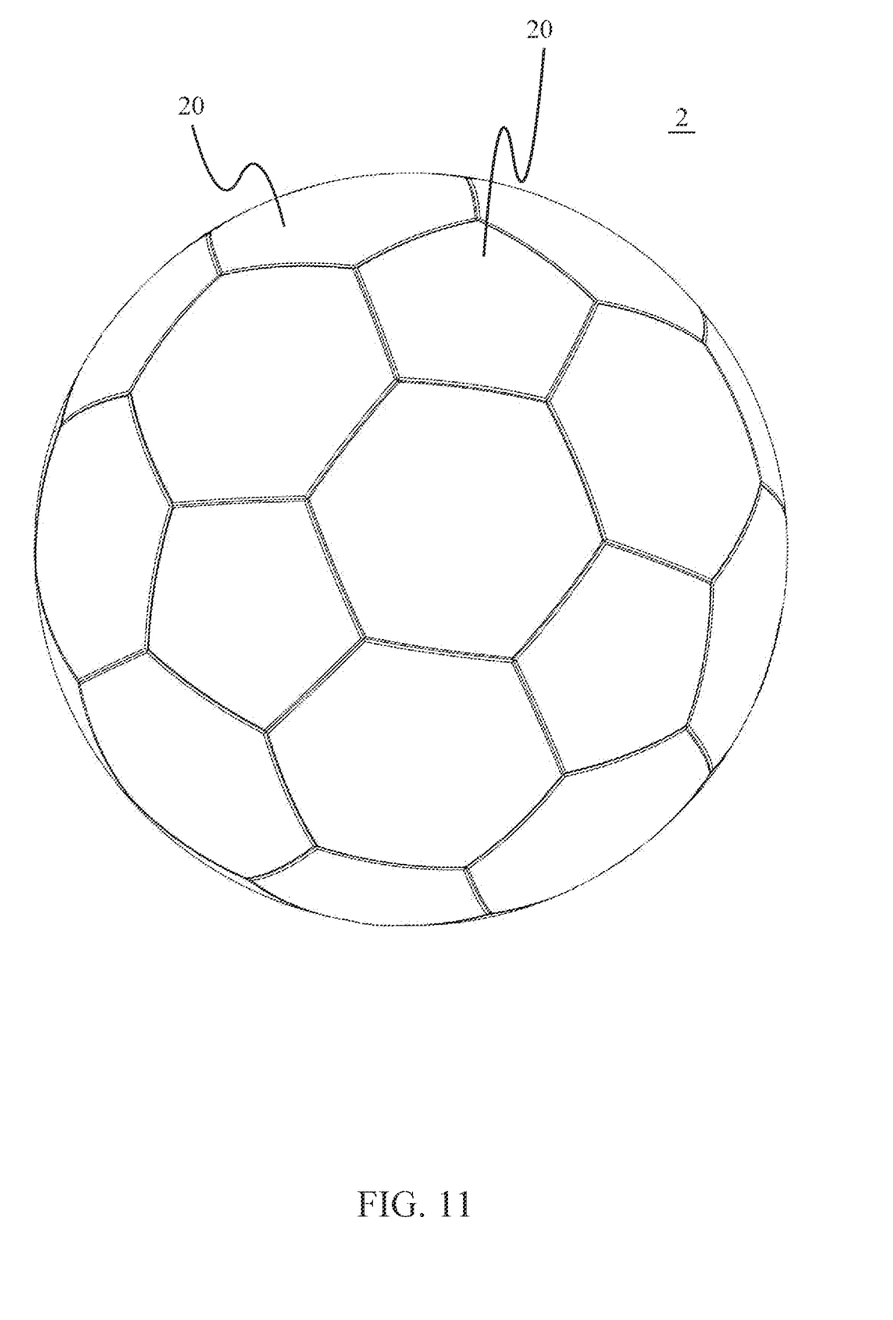
FIG. 11 is an isometric view of the attachment piece of the present invention.

The attachment piece 2 is utilized as a mechanism to construct a system from a plurality of asteroid miners 21 by facilitating connection into a sphere. The attachment piece 2 is the fastening device comprising a plurality of slots 20 configured to receive and secure an asteroid miner 1, attaching a plurality of the asteroid miners 21 together into a system. The attachment piece 2 is a web-like frame structure that captures the shape of a sphere. The attachment piece is designed in a fashion so that the edges of the body 10 align with the slots 20 and structure of the attachment piece 2. Note that the attachment piece 2 can be found in different embodiments as it is a mechanism used to assist the attachment of a plurality of asteroid miners 21.

Figure 12:
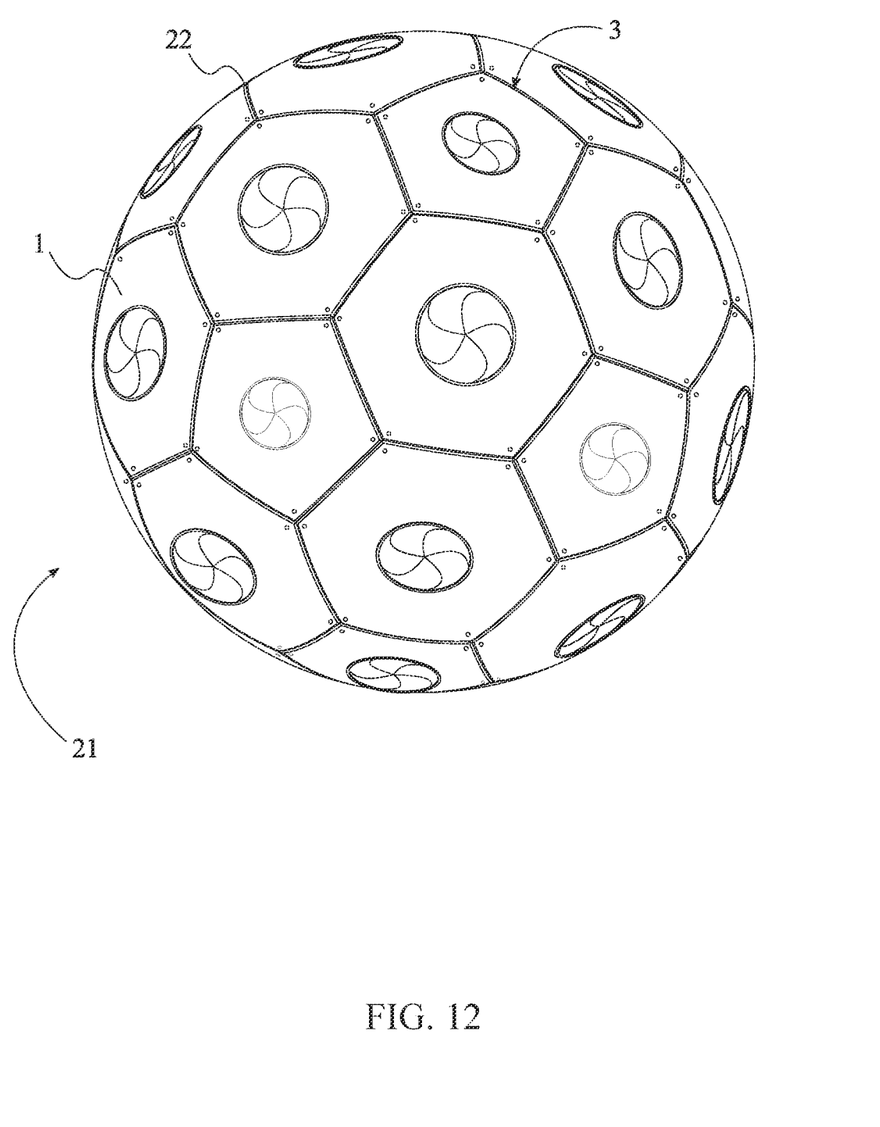
FIG. 12 is an isometric view of the present invention attached as a system, in accordance with another embodiment.

Within a different embodiment of the present invention, as seen in FIG. 12, the edges of the plurality of asteroid miners 21 are designed to expand and attach to one another during the process of creating a system of the present invention for asteroid mining. The ability to attach the plurality of the asteroid miners 21 into a system by a fastening mechanism 22 on the edges of the body 10 disposes the need of the attachment piece 2 when creating a system of the present invention. In such an embodiment, the fastening mechanism 22 may be magnets or any other fastener that is capable of creating an airtight seal between the plurality of asteroid miners 21. A membrane 3 is disposed between the fastening mechanism 22 of each adjoining asteroid miner 1. The membrane 3 can be any thin film of plastic capable of separating the edges of the plurality of asteroid miners 21 in space to avoid cold welding. The membrane 3 can be secured in place by any suitable means, including but not limited to adhesive bonding and friction fit.

Figure 1:
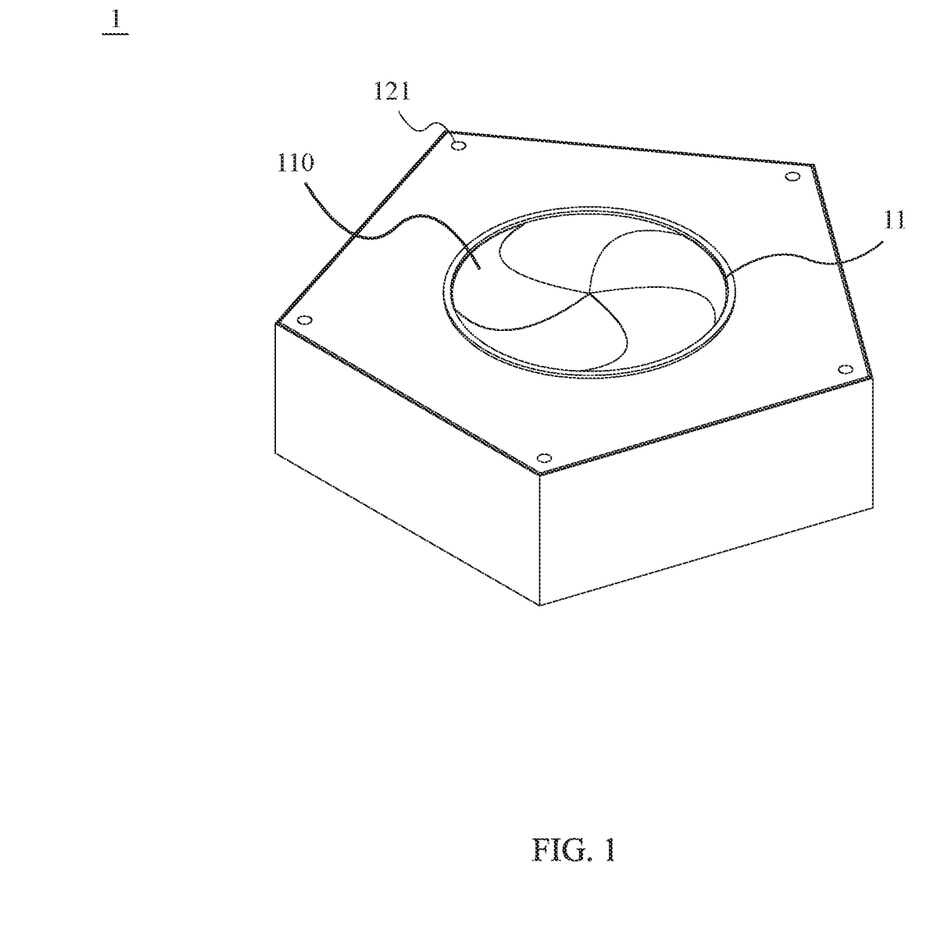
FIG. 1 is an isometric view of the pentagonal body of the present invention.
Figure 2:
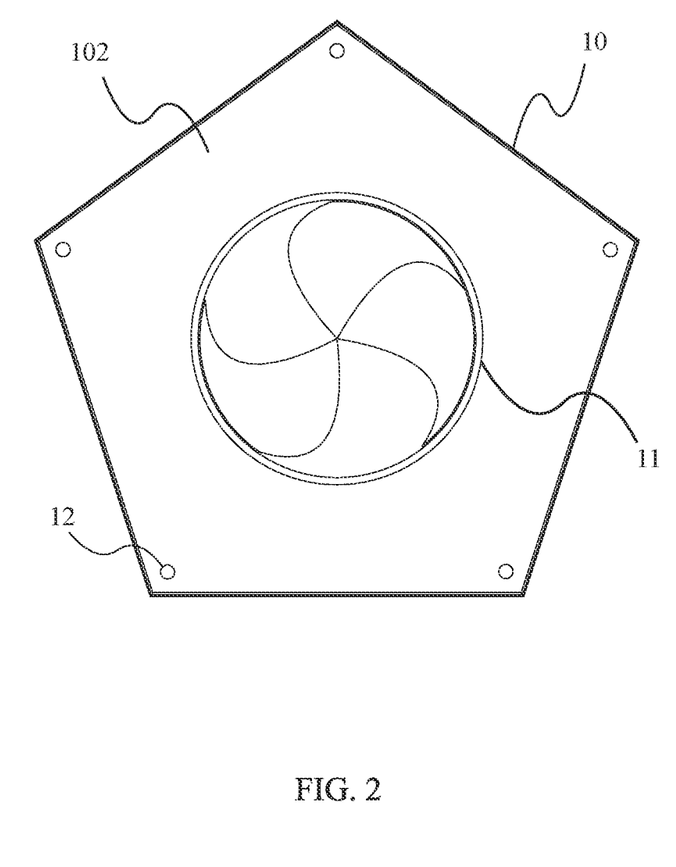
FIG. 2 is a front view of the pentagonal body of the present invention.
Figure 3:
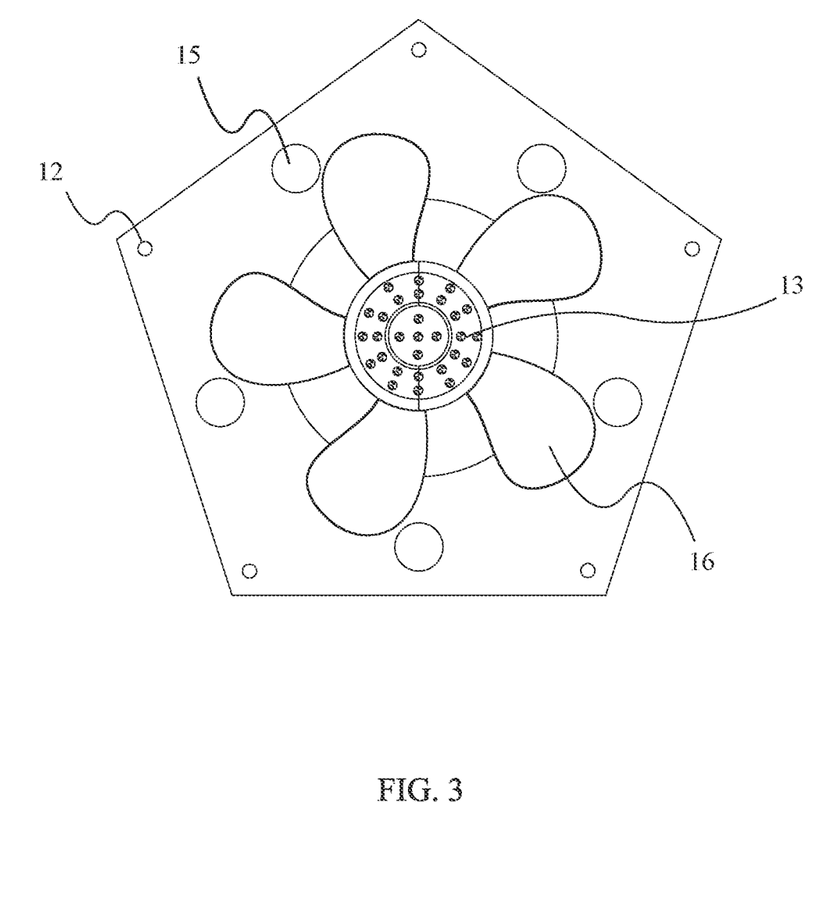
FIG. 3 is a rear view of the pentagonal body of the present invention.
Figure 4:
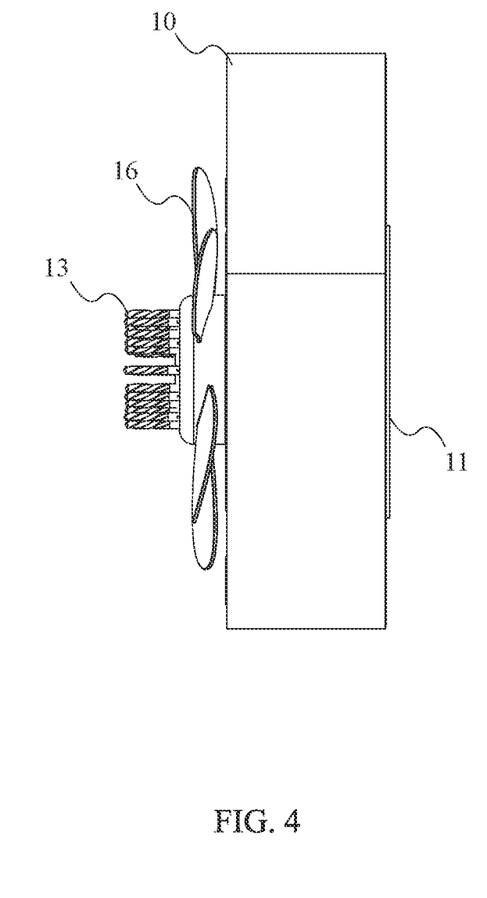
FIG. 4 is a side view of the pentagonal body of the present invention.
Figure 5:
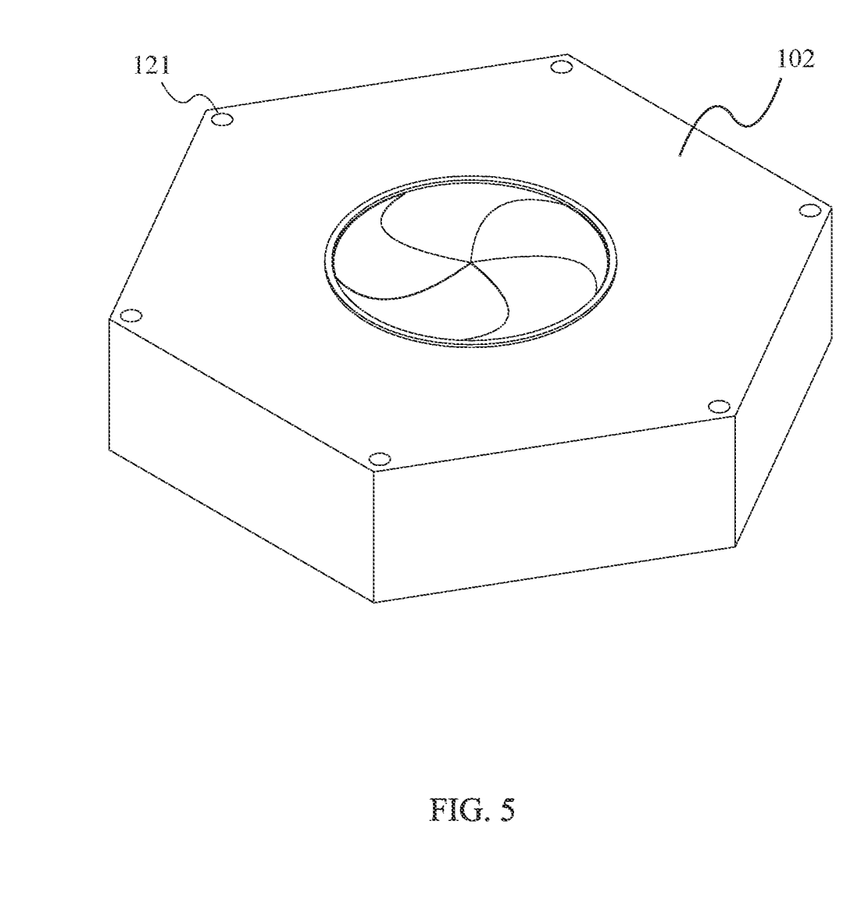
FIG. 5 is an isometric view of the hexagonal body of the present invention.
Figure 6:
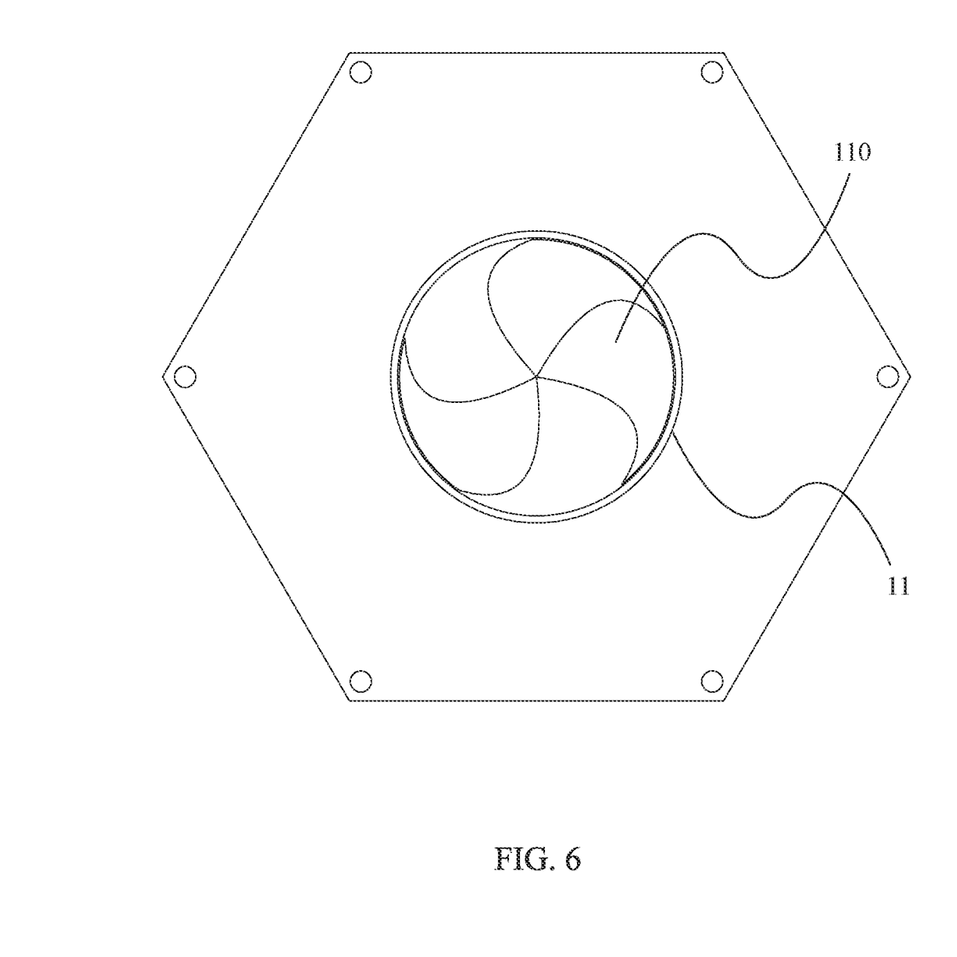
FIG. 6 is a front view of the hexagonal body of the present invention.
Figure 7:
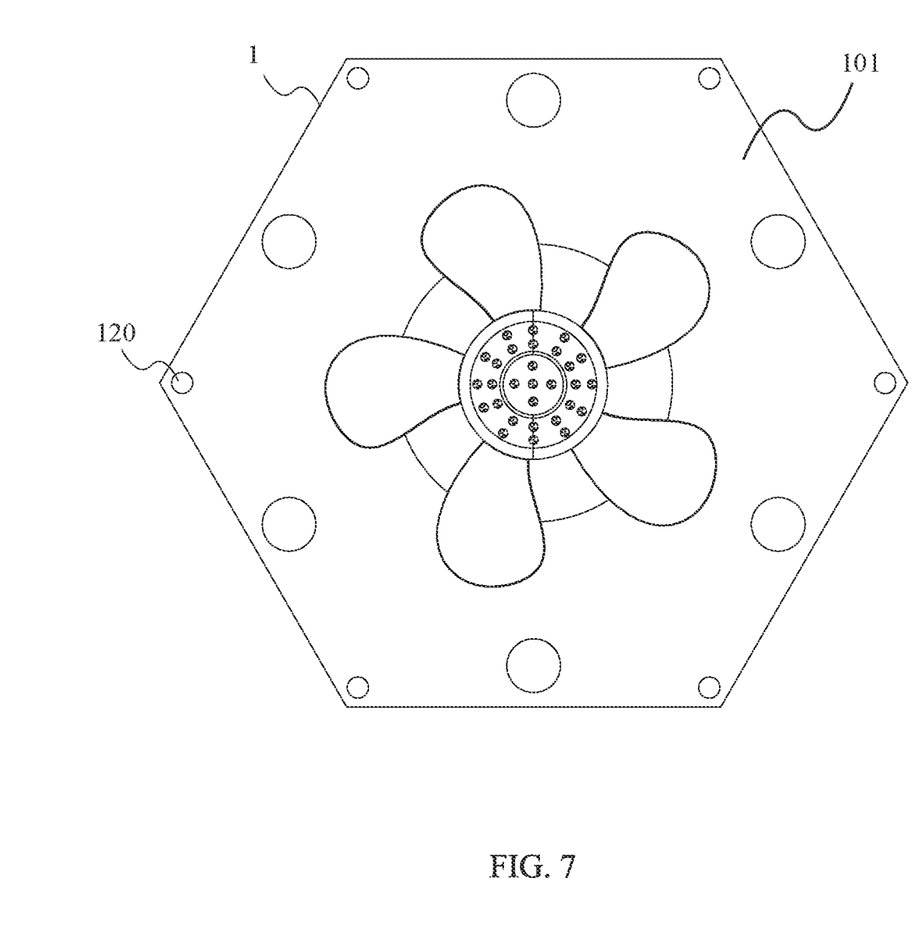
FIG. 7 is a rear view of the hexagonal body of the present invention.
Figure 8:
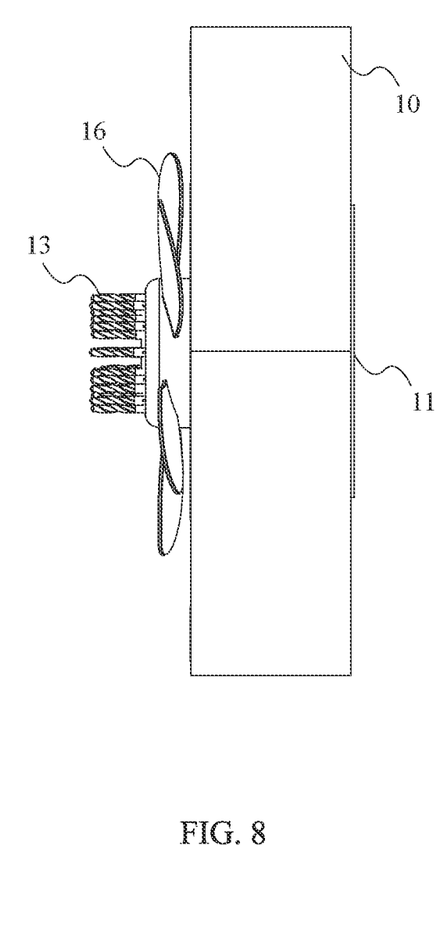
FIG. 8 is a side view of the hexagonal body of the present invention.
Figure 9:
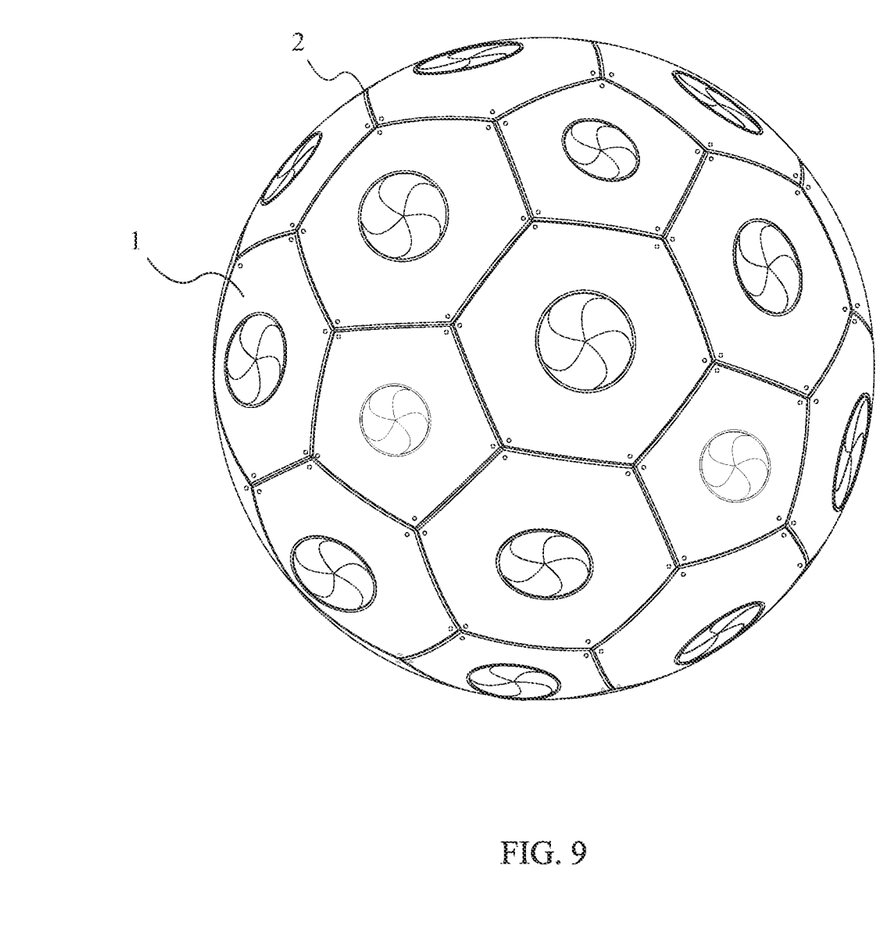
FIG. 9 is an isometric view of the present invention attached as a system.

The present invention provides an apparatus and system utilized for asteroid mining. In the preferred embodiment of the present invention, a plurality of asteroid miners 21 are utilized as a system. Each of the plurality of asteroid miners 21 is designed as described above for the asteroid miner 1. The plurality of the asteroid miners 21 may be attached together to form a sphere-like shape similar to a soccer ball, using the attachment piece 2, having an airtight seal. The formed soccer ball-like structure creates a shell around an asteroid. Each body 10 of the present invention will store compressed air that can be used to create an environment within the structure. The plurality of speakers 15 and plurality of drills 13 found on the system of the present invention are utilized to break down and partition an asteroid. The asteroid may be broken down and partitioned into smaller portions. These portions may then be transferred through the aperture 11 and into the baggage 17 by opening the aperture 11. Since the air compressors 14 create air pressure within the shell, a vacuum mechanism is created when the aperture 11 is opened. This vacuum mechanism may be aided by the fan 16 to propel the smaller portions of asteroids through the aperture 11 and into the baggage 17. The system of the present invention can then be separated and descend back to Earth. Alternatively, the baggage 17 of each of the plurality of asteroid miners of may be detached from the body 10 and individually collected where necessary. In such a case, the baggage 17 can be replaced or the aperture 11 can remain closed while the remainder of the plurality of asteroid miners 21 continue to collect material.

Although the invention has been explained in relation to its preferred embodiment, it is to be understood that many other possible modifications and variations can be made without departing from the spirit and scope of the invention.

What is claimed is:

1. An asteroid mining apparatus, comprising:
 a body;
 an aperture;
 a plurality of interior holes;
 a drill;
 a set of air compressors;
 the body having an interior face and an exterior face;
 the aperture extending through the interior face and the exterior face of the body;
 the plurality of interior holes arranged on the interior face of the body;
 the drill connected to the interior face of the body and oriented away from the body;
 the set of air compressors being housed within the body; and
 each of the plurality of interior holes being fluidly connected to at least one of the set of air compressors.

2. The asteroid mining apparatus of claim 1, further comprising:
 a plurality of speakers configured to produce sound waves; and
 the plurality of speakers attached to the interior surface of the body.

3. The asteroid mining apparatus of claim 1, further comprising:
 a fan; and
 the fan connected to the interior surface of the body and oriented away from the body.

4. The asteroid mining apparatus of claim 1, further comprising:
 a plurality of exterior holes;
 the plurality of exterior holes mounted on the exterior surface of the body; and
 each of the plurality of exterior holes being fluidly connected to at least one of the set of air compressors.

5. The asteroid mining apparatus of claim 1, comprising:
 a baggage;
 the baggage mounted on the exterior surface of the body, wherein the baggage completely covers the aperture on the exterior surface of the body; and
 the baggage being configured to receive material passing through the aperture.

6. The asteroid mining apparatus of claim 1, wherein the plurality of interior holes are radially symmetrically positioned around the aperture.

7. An asteroid mining apparatus, comprising:
 a body;
 an aperture;
 a drill;
 a baggage;
 the body having an interior face and an exterior face;
 the aperture extending through the interior face and the exterior face of the body;
 the drill connected to the interior face of the body and oriented away from the body;
 the baggage mounted on the exterior surface of the body, wherein the baggage completely covers the aperture on the exterior surface of the body; and
 the baggage being configured to receive material passing through the aperture.

8. The asteroid mining apparatus of claim 7, further comprising:
 a fan; and
 the fan connected to the interior surface of the body and oriented away from the body.

9. The asteroid mining apparatus of claim 8, further comprising:
 a plurality of interior holes;
 a set of air compressors;
 the plurality of interior holes mounted on the interior face of the body;
 the set of air compressors being housed within the body; and
 each of the plurality of interior holes being fluidly connected to at least one of the set of air compressors.

10. The asteroid mining apparatus of claim 9, wherein the plurality of interior holes are radially symmetrically positioned around the aperture.

11. The asteroid mining apparatus of claim 7, further comprising:

a plurality of exterior holes;
the plurality of exterior holes mounted on the exterior surface of the body; and
each of the plurality of exterior holes being fluidly connected to at least one of the set of air compressors.

12. The asteroid mining apparatus of claim 7, further comprising:
    a plurality of speakers configured to produce sound waves; and
    the plurality of speakers attached to the interior surface of the body.

13. A system for mining and packaging asteroid material, comprising:
    a plurality of asteroid miners;
    an attachment piece;
    each of the plurality of asteroid miners configured to breakdown and collect material;
    the attachment piece comprising a plurality of slots;
    each of the plurality of slots configured to accept and secure one of the plurality of asteroid miners;
    each of the plurality of asteroid miners attached to one of the plurality of slots; and
    wherein the combination of the plurality of asteroid miners and the plurality of slots creates an enclosed chamber.

14. The system for mining and packaging asteroid material of claim 13, wherein each of the plurality of asteroid miners further comprises:
    a body;
    an aperture;
    the body having an interior face and an exterior face; and
    the aperture extending through the interior face and the exterior face of the body.

15. The system for mining and packaging asteroid material of claim 14, wherein each of the plurality of asteroid miners further comprises:
    a drill; and
    the drill connected to the interior face of the body and oriented away from the body.

16. The system for mining and packaging asteroid material of claim 14, wherein each of the plurality of asteroid miners further comprises:
    a plurality of interior holes;
    a set of air compressors;
    the plurality of interior holes arranged on the interior face of the body;
    the set of air compressors being housed within the body; and
    each of the plurality of interior holes being fluidly connected to at least one of the set of air compressors.

17. The system for mining and packaging asteroid material of claim 16, wherein each of the plurality of asteroid miners further comprises:
    a plurality of exterior holes;
    the plurality of exterior holes mounted on the exterior surface of the body; and
    each of the plurality of exterior holes being fluidly connected to at least one of the set of air compressors.

18. The system for mining and packaging asteroid material of claim 14, wherein each of the plurality of asteroid miners further comprises:
    a fan; and
    the fan connected to the interior surface of the body and oriented away from the body.

19. The system for mining and packaging asteroid material of claim 14, wherein each of the plurality of asteroid miners further comprises:
    a baggage;
    the baggage mounted on the exterior surface of the body, wherein the baggage completely covers the aperture on the exterior surface of the body; and
    the baggage being configured to receive material passing through the aperture.

* * * * *